(12) United States Patent
Lafleur et al.

(10) Patent No.: US 6,810,741 B1
(45) Date of Patent: Nov. 2, 2004

(54) METHOD FOR DETERMINING A VIBRATORY EXCITATION SPECTRUM TAILORED TO PHYSICAL CHARACTERISTICS OF A STRUCTURE

(75) Inventors: François Lafleur, Laprairie (CA); Marc Thomas, Montreal (CA); Frédéric Laville, Montreal (CA)

(73) Assignee: Centre de Recherche Industrielle du Québec, Sainte-Foy (CA)

(*) Notice: Subject to any disclaimer, the term of this patent is extended or adjusted under 35 U.S.C. 154(b) by 0 days.

(21) Appl. No.: 10/425,794

(22) Filed: Apr. 30, 2003

(51) Int. Cl.[7] .......................... G01N 29/12; G01M 7/00
(52) U.S. Cl. .......................................... 73/571; 73/579
(58) Field of Search ........................ 73/571, 579, 662, 73/663, 665, 432.1, 583–586, 856.6; 702/56, 109

(56) References Cited

U.S. PATENT DOCUMENTS

| | | |
|---|---|---|
| 5,767,406 A | 6/1998 | Hu |
| 6,668,650 B1 * | 12/2003 | Lafleur et al. ................. 73/571 |
| 2002/0183942 A1 | 12/2002 | Lafleur et al. |

FOREIGN PATENT DOCUMENTS

WO   WO01/01103 A1   4/2001

OTHER PUBLICATIONS

D. S. Steinberg, Vibration . . . equipment, pp. 185–187, 243–244, John Wiley & Sons, USA, 1988.
Navy Manufactured Screening Program, p. 16, NAVMAT P–9492, 1979.
W. Tustin, Acceleraed . . . handbook, Guide for achieving quality products, pp. 155–181, USA, 2001.
IEST Product Reliability Division, Management . . . ESS Process, pp. 41–50, 57–64 USA, 1999.
K. E. Buratynski, A comparison . . . testing, (AST 99), IEEE CPMT Soc. Boston, pp. 319–328, USA, 1999.

(List continued on next page.)

Primary Examiner—Helen Kwok
(74) Attorney, Agent, or Firm—Jean-Claude Boudreau

(57) ABSTRACT

Methods for determining a vibratory excitation spectrum are tailored to physical characteristics of a structure having critical elements located thereon to be subjected to vibration testing, such as a PCB to which connectors, resistors, capacitors, inductances, Integrated Circuits (IC) or Ball Grid Array components (BGA) are mounted. The physical characteristics includes a frequency response function corresponding to a testing environment temperature and defined in term of power spectral density amplitude over a global excitation frequency range for the vibratory excitation spectrum and characterized by a plurality of power spectral density amplitude peaks corresponding to a plurality of natural resonance frequencies, each being associated with respective mode shape and damping factor. The method comprises the steps of locating at least one anti-resonance frequency range extending between two main natural resonance frequencies, defining on the basis of the amplitude peaks corresponding to the main natural resonance frequencies at least two corresponding sets of amplitude peaks each including the amplitude peak associated with any other natural resonance frequency near corresponding main natural resonance frequency included in the corresponding set, and defining from the sets of amplitude peaks at least two spectral profile sections associated with corresponding frequency ranges. Each spectral profile section is expressed as power spectral density amplitude according to the mode shape and damping factor associated with corresponding main and other natural resonance frequencies and to the location of said critical elements, to form a vibratory excitation spectrum capable of maximizing vibration power transfer to the critical elements of the structure to be subjected to vibration at the testing environment temperature.

10 Claims, 9 Drawing Sheets

OTHER PUBLICATIONS

W. Tustin et al., Acoustical . . . solution, Evaluation Engineering, vol. 4, No 8, pp. 58–63, USA, 2001.

P. A. Rodger, Vibration tools . . . testing, (AST 2000), IEEE CMPT Soc. Denver, pp. 247–259, USA, 2000.

C. Felkins, Accelerated . . . handbook: Guide . . . products, IEEE 2001, Ch. 9, pp. 137–154, USA, 2001.

P. Viswanadham, Failure mode . . . packages, ITP, Chapman & Hall, p. 65, USA, 1998.

D. J. Ewins, Modal testing . . . practice, RSP Ltd, pp. 25–26, England, 1984.

F. Lafleur, Development of an ESS acoustical device ESSAD, pp. 391–404. IEEE Press, USA, 2000.

Institute of Env. Sciences, Environmental Stress Screening Guideline for Assemblies, Mar. 1990.

Wayne, T., Random Vibration . . . Products, Proceeding of EtroniX 2001, Anaheim, Ca, 2001.

* cited by examiner

METHOD FOR DETERMINING A VIBRATORY EXCITATION SPECTRUM TAILORED TO PHYSICAL CHARACTERISTICS OF A STRUCTURE

FIELD OF INVENTION

The present invention relates to vibration testing, and more particularly to methods for determining vibratory excitation spectrum tailored to physical characteristics of a structure having critical elements located thereon, such as a printed circuit board including electronic components associated with an interconnecting layout, some of which are considered as critical elements including connectors, resistors, capacitors, inductances, Integrated Circuits (IC) or Ball Grid Array components (BGA), to be subjected to vibration testing, under predetermined thermal conditions.

BACKGROUND OF INVENTION

The production of reliable electronic products requires the use of defect precipitation and detection processes such as Environmental Stress Screening (ESS). The defect detection process should take place at different integration stages during the manufacturing process. Although each electronic system and the location and types of defects vary widely, an average 70% of the defects found in electronics are a result of a defect at the Printed Circuit Board (PCB) level (solder, component defects). The other 30% of the causes of failures are found at the system assembly level (connectors, errors in assembly). ESS testing at PCB manufacturing level offers many advantages. Diagnostics for individual circuit cards can run faster and may be more specific for identifying the root cause of the fault than diagnostics at the system level. Other stresses such as voltage margining and power cycling can be tailored to each circuit card type to maximize precipitation and detection of defects. Moreover, finding a problem at the circuit card level is usually less expensive than at the system assembly level.

The use of vibration and thermal stresses to find latent defects was first advocated and promoted in the military field. As mentioned by D. S. Steinberg in "*Vibration analysis of electronic equipment*", Second edition ed. New York: John Wiley & sons, 1988, pp. 443, electronic chassis assemblies that have high resonant frequencies can be effectively screened in vibration using the NAVMAT P-9492 *"Navy Manufactured Screening Program,* 1979" p. 16. The vibration profile referenced in the NAVMAT P-9492 is a 6 g RMS random 20–2000 Hz Power Spectral Density (PSD) set of curves. However, this profile can adversely damage flexible products that have low resonant frequencies, as mentioned by Steinberg in the above-cited reference. As stated by W. Tustin, in *"Accelerated stress testing handbook: Guide for achieving quality products"* edited by H. Anthony Chan and Paul J. Englert, New York: IEEE press, 2001, Chapter 10, pp. 155–181, it is desirable to carry out vibration testing experiments with other spectra to adjust the frequency content of the excitation. It is well known that a given defect will only be precipitated when sufficient fatigue damage is induced in the mechanical structure and this often occurs at the structures natural resonant frequencies. The vibration energy that does not correspond to the resonance frequencies of the unit under test is wasted, specially for simple mechanical systems such as PCBs. Therefore the most efficient ESS vibration applied to the unit under test should be based on the response of the product, and not on a predetermined spectrum. In *"Management and Technical Guidelines for the ESS Process."* Mount Prospect, Ill. 60056: Institute of Environmental Science and Technology, 1999, pp. 41–50, tailored input spectra an tailored spectral response methods are proposed, which include spectrum tailoring respectively at the PCB and assembly level.

The ESS process does not call for a specific type of vibration equipment. However, electro-dynamic and repetitive shock shakers are commonly used in typical ESS processes, and more recently acoustic vibrators as disclosed International PCT Patent Application published under no. WO 01/01103A1 to Lafleur et al. and naming the same assignee as the present patent specification. The physical operation modes of these equipment are quite different and have been the object of comparative works reported by several authors such as by E. K. Buratynski in *"A Comparison of Repetitive Shock and Electrodynamics Equipment for Vibration Stress Testing"*, Proceeding of the $5^{th}$ Accelerated Stress Testing Workshop (AST 99), IEEE CPMT Society, Boston, Mass, 1999, pp. 319–328, by W. Tustin and al. in *"Acoustical Screening—A Sound Solution"*, Evaluation Engineering, Vol. 40, No. 8, pp. 58–63, 2001, by P. A. Rodger in "Vibration Tools for Accelerated Stress Testing", Proceeding of the $6^{th}$ Accelerated Stress Testing Workshop (AST 2000), IEEE CPMT Society, Denver, Colo., 2000, pp.247–259, and by W. Tustin in "Random vibration for the developmental testing and for post-production screening of high-rel electronic products", Proceeding of EtroniX 2001, Anaheim, Calif., 2001, pp.7. The electro-dynamic shaker is considered to be the most versatile type of vibration equipment. The electro-dynamic shaker allows to control random or sine vibration at the base of the unit under test in term of frequency and level typically from 2 to 2000 Hz, at high vibration level up to large payload. However, the relatively and high acquisition cost of this equipment constitute its principal disadvantage. On the other hand, the repetitive shock shaker creates vibration on the unit under test by impacting the vibration table with several air driven impact hammers. This mode of operation leads to a vibration without providing spectrum control, the spectrum being directed by vibration platform natural frequencies. As stated by C. Felkins in *"Accelerated stress testing handbook: Guide for achieving quality products"* edited by H. Anthony Chan and Paul J. Englert. New York: IEEE press, 2001, Chapter 9, pp. 137–154, if table resonance and product resonance overlap, then a way must be found to either damp the table resonance or alter the product fixtures. The repetitive shock excitation presents the advantage of allowing an easy 6 degrees of freedom. However it inputs more energy into high frequencies than low frequencies and it may cause some defect precipitation that are not related to early failure. Acoustic vibrators such as disclosed International PCT Patent Application published under no. WO 01/01103A1 can be used as economical system for testing structures such as PCB's. A main advantage of acoustic vibrator is to allow vibration control in amplitude and frequency over a wide bandwidth for flexible structures with non-contact and directional excitation. Typically, the acoustical excitation is able to achieve nominal vibratory response in random excitation of 20 g rms or higher in the 2 HZ to 2000 Hz frequency domain, as well a sine excitation at level reaching 100 g peak at PCB's resonance. While the electro-dynamic shaker is well adapted for heavier structures, acoustical vibrators are particularly suitable for flexible structures such as PCBs for cost and simplicity reasons, especially when combined with thermal stimulation. The acoustical chamber can be used as a thermal chamber, thus avoiding the use of specific thermal barriers, as required with electro-dynamic repetitive shock shakers. In WO 01/01103A1, Lafleur et al. discloses typical cycling temperature response curves as obtained using a thermal control subsystem provided with a set of temperature sensors, while imparting vibration to a PCB under test. In the presented example, a predetermined profile for performing thermal cycling stress screening of the PCB and as previously stored in the system computer memory is selected by a user. Characteristics of the selected cycling profile were determined according to well known criteria, including cycle characteristics (low temperature, high temperature, product thermal response rate, dwell times at temperature extremes), number of thermal cycles and PCB condition (powered, unpowered, monitored, unmonitored), with reference to *"Environmental Stress Screening Guidelines for Assemblies"*, Institute of Environmental Sciences, March 1990, and to *"Product Reliability Division Recommended Practice 001.1, Management and Technical Guidelines for the ESS Process"* Institute of Environmental Sciences and Technology, January 1999, pp. 57–64.

The use of modal analysis methods for determining dynamic vibration characteristics of a structure, including natural frequencies, mode shapes and damping factors is known. Such a method is disclosed in U.S. Patent Application published under no 2002/0183942 A1 to Lafleur et al. However, the application of known modal analysis methods to spectrum tailoring for specific structures such as PCBs to be subjected to ESS testing, in a view to maximize vibration power transfer to the critical elements of the PCB to be subjected to vibration according to a given testing environment temperature, has not been widely developed prior to the present invention.

SUMMARY OF INVENTION

It is therefore a main object of the present invention to provide methods for determining vibratory excitation spectrums tailored to physical characteristics of a structure having critical elements located thereon to be subjected to vibration testing, which spectrums are capable of maximizing vibration power transfer to the critical elements of the structure a given testing environment temperature.

It is also an object of the present invention to provide methods for determining vibratory excitation spectrums tailored to physical characteristics of structures such as printed circuit boards (PCBs) having critical elements located thereon including connectors, resistors, capacitors, inductances, Integrated Circuits (ICs) or Ball Grid Array components (BGA), to be subjected to vibration testing, under predetermined thermal conditions set forth by Environmental Stress Screening (ESS) procedures, to either detect or precipitate latent defects that may have otherwise caused failure of the PCB in the field.

According to the above mentioned main object, from a first broad aspect of the invention, there is provided a method for determining a vibratory excitation spectrum tailored to physical characteristics of a structure having critical elements located thereon to be subjected to vibration testing, said physical characteristics including a frequency response function corresponding to a testing environment temperature and defined in term of power spectral density amplitude over a global excitation frequency range for said vibratory excitation spectrum and characterized by a plurality of power spectral density amplitude peaks corresponding to a plurality of natural resonance frequencies each being associated with respective mode shape and damping factor, the method comprising the steps of: i) locating as part of said global excitation frequency range at least one anti-resonance frequency range extending between two said natural resonance frequencies considered as main natural resonance frequencies; ii) defining on the basis of the amplitude peaks corresponding to said main natural resonance frequencies at least two corresponding sets of amplitude peaks each including the amplitude peak associated with any other said natural resonance frequency near corresponding said main natural resonance frequency included in said corresponding set; and iii) defining from said at least two sets of amplitude peaks at least two spectral profile sections associated with corresponding frequency ranges as part of said global excitation frequency range, each said spectral profile section being expressed as power spectral density amplitude according to the mode shape and damping factor associated with corresponding said main and any other natural resonance frequencies and to the location of said critical elements, to form a vibratory excitation spectrum capable of maximizing vibration power transfer to the critical elements of the structure to be subjected to vibration at said testing environment temperature.

According to the above mentioned main object, from a further broad aspect of the invention, there is provided a method for determining a set of vibratory excitation spectrums tailored to physical characteristics of a structure having critical elements located thereon to be subjected to vibration testing under a plurality of testing environment temperatures, the method comprising the step of: i) providing a plurality of frequency response functions representing said physical characteristics at said testing environment temperatures, each said function being defined in term of power spectral density amplitude over a global excitation frequency range for all said vibratory excitation spectrums and characterized by a plurality of power spectral density amplitude peaks corresponding to a plurality of natural resonance frequencies each being associated with respective mode shape and damping factor; ii) locating as part of said global excitation frequency range and for each said frequency response function at least one anti-resonance frequency range extending between two said natural resonance frequencies considered as main natural resonance frequencies; iii) defining on the basis of the amplitude peaks corresponding to said main natural resonance frequencies and associated with each said frequency response function at least two corresponding sets of amplitude peaks each including the amplitude peak associated with any other said natural resonance frequency near corresponding said main natural resonance frequency included in said corresponding set; and iv) defining from said at least two sets of amplitude peaks associated with each said frequency response function at least two spectral profile sections associated with corresponding frequency ranges as part of said global excitation frequency range, each said spectral profile section being expressed as power spectral density amplitude according to the mode shape and damping factor associated with corresponding said main and any other natural resonance frequencies and to the location of said critical elements, to form each said vibratory excitation spectrum capable of maximizing vibration power transfer to the critical elements of the structure to be subjected to vibration at each said testing environment temperature.

According to the above mentioned main object, from a further broad aspect of the invention, there is provided a method for determining a vibratory excitation spectrum tailored to physical characteristics of a structure having critical elements located thereon to be sequentially subjected to vibration testing under a plurality of testing environment temperatures, the method comprising the step of: i) providing a plurality of frequency response functions representing said physical characteristics at said testing environment temperatures, each said function being defined in term of power spectral density amplitude over a global excitation frequency range for said vibratory excitation spectrum and characterized by a plurality of power spectral density amplitude peaks corresponding to a plurality of natural resonance frequencies each being associated with respective mode shape and damping factor; ii) locating as part of said global excitation frequency range and for each said frequency response function at least one anti-resonance frequency range extending between two said natural resonance frequencies considered as main natural resonance frequencies; iii) defining on the basis of the amplitude peaks corresponding to said main natural resonance frequencies and associated with each said frequency response function at least two corresponding sets of amplitude peaks each including the amplitude peak associated with any other said natural resonance frequency near corresponding said main natural resonance frequency included in said corresponding set; iv) and defining from said at least two sets of amplitude peaks at least one spectral profile section associated with a corresponding frequency range as part of said global excitation frequency range, each said spectral profile section being expressed as power spectral density amplitude according to the mode shape and damping factor associated with corresponding said main and any other natural resonance frequencies and to the location of said critical elements, to form a vibratory excitation spectrum capable of maximizing vibration power transfer to the critical elements of the structure to be subjected to vibration at all said testing environment temperature.

According to the above mentioned main object, from another broad aspect of the invention, there is provided a method for vibratory testing a structure having critical elements located thereon at a plurality of sequential testing environment temperatures, comprising the steps of: i) determining a set of vibratory excitation spectrums tailored to physical characteristics of the structure from a plurality of frequency response functions representing said physical characteristics at said testing environment temperatures, each said function being defined in term of power spectral density amplitude over a global excitation frequency range for all said vibratory excitation spectrums; and ii) imparting vibration to said structure according to each said vibratory excitation spectrum sequentially at each corresponding said testing environment temperature to maximize vibration power transfer to the critical elements of the structure.

According to the above mentioned main object, from another broad aspect of the invention, there is provided a method for vibratory testing a structure having critical elements located thereon at a plurality of sequential testing environment temperatures, comprising the steps of: i) determining a vibratory excitation spectrum tailored to physical characteristics of the structure from a plurality of frequency response functions representing said physical characteristics at all said testing environment temperatures, each said function being defined in term of power spectral density amplitude over a global excitation frequency range for said vibratory excitation spectrum; and ii) sequentially imparting vibration to said structure according to said vibratory excitation spectrum at said sequential testing environment temperatures to maximize vibration power transfer to the critical elements of the structure.

BRIEF DESCRIPTION OF THE DRAWINGS

Preferred embodiments of the methods according to the present invention will now be described with reference to the accompanying drawings in which.

DETAILED DESCRIPTION OF THE PREFERRED EMBODIMENTS

Figure 1A:
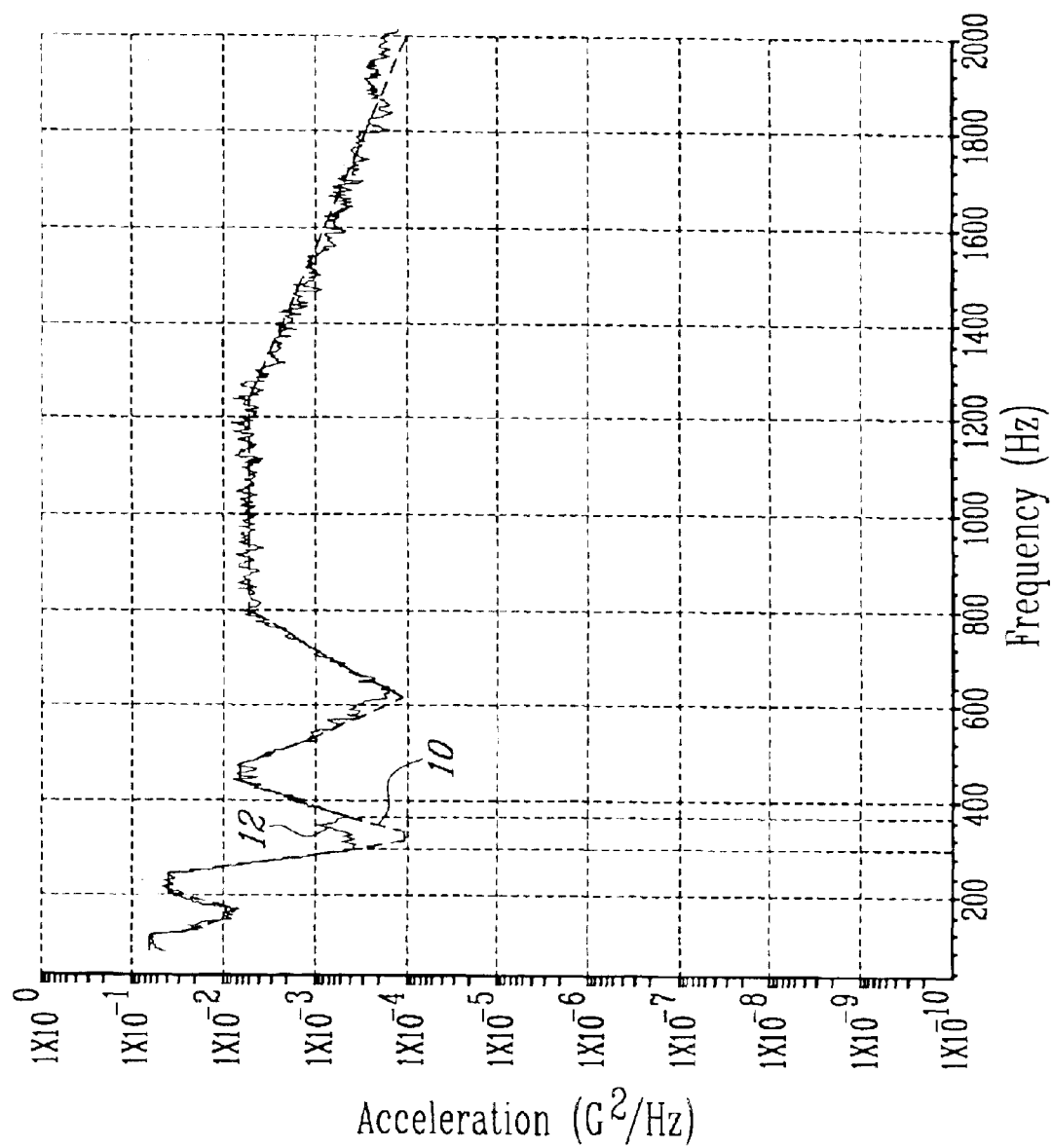
FIG. 1A is a graph representing a spectrum tailored to the physical characteristics of a typical PCB provided with all electronic components mounted thereon, showing also the superimposed PCB's response, as obtained using a basic preferred embodiment of a method according to the invention at ambient temperature (+25° C.)

Referring now to the graph of FIG. 1A, there is shown a spectrum represented by an acceleration ($G^2/Hz$) versus frequency (Hz) curve 10 tailored to the physical characteristics of a typical 483×254 mm, 8 layers telecom PCB provided with all electronic components mounted thereon, as obtained using a first preferred embodiment of the method according to the invention, wherein each PCB type can have its unique ESS thermal and vibration profile applied thereto, based on PCB's physical characteristics such as size and resonance response as will be explained later in detail. Also shown in the graph of FIG. 1A superimposed on curve 10 is a PCB's response curve 12 that was obtained following a ESS vibration testing process at ambient temperature (25° C.) using the previously tailored spectrum, as obtained using an acoustical vibrator such as described in copending U.S. patent application Ser. No. 10/018,348 dated Dec. 19, 2001 to Lafleur et al. and naming the same inventors as the present invention, which published application is incorporated herein by reference. The acoustical excitation controller provided on the vibrator was programmed to generate a control or demand signal reflecting the characteristics of the tailored spectrum, to produce an overall acceleration level of 3.5 g rms. It can be seen from FIG. 1A that the control signal represented by curve 10 well follows the demand over a large range of frequency, except at one anti-resonance area characterizing the tested PCB, extending between 250 and 290 Hz. While the present invention may carried out using other types of testing vibrators such as electro-dynamic and repetitive shock shakers, one of the advantages of acoustical excitation is the possibility to increase the frequency bandwidth of the stimulation over 2000 Hz, but its efficiency can be limited by the dynamic load.

The environmental stimulations that may be used to precipitate and detect latent defects in ESS testing generally include vibration, thermal soaks and thermal cycles but may also include power cycles, humidity and other parameters. Each of these stimulations creates fatigue stress to the PCB that cumulates to cause failures. Regarding the stress effect of vibration, the flexion stress is more related to the curvature of the PCB than to the acceleration level, the stress being proportional to the inverse of the radius of curvature of the board. This implies that the stress level is spatially distributed on the PCB. The stress is function of the level of excitation of the different mode shapes of the PCB. As to the stress effect of temperature, the difference of the Coefficient of Thermal Expansion (CTE) between the PCB materials, the components and the solder joints leads to relative displacements on the PCB. These relative displacements cause a stress distribution on the PCB. The range of the CTE mismatches are typically in the range of 7 to 20 ppm/° C. Furthermore, the dynamic properties of the PCBs are dependent on temperature. The resonance frequencies and the damping ratio will change with the temperature of the ESS process. These physical characteristics of the PCBs may be determined through known modal analysis of PCBs considered as a plate shaped structure, as will now be explained in detail. At first, every structure is ruled by equations of motion that link the excitation on the structure with the physical dynamics properties (Resonance frequencies, damping, mode shapes) and the displacement of the structures. Theses equations of motion are:

$$[M]\{\ddot{x}\}+[C]\{\dot{x}\}+[K]\{x\}=\{F(t)\} \quad (1)$$

wherein M, C, K are respectively the mass, damping and stiffness matrix, x is the structure displacement and F is the force applied on the structure. Some dynamic properties as frequency and damping of the PCBs are temperature related. The knowledge of these dynamic properties allows to predict the displacement versus the force amplitude and frequency content. By the superposition theorem, one can calculat the displacement taking into account the contribution of each excited mode. The response of a plate to a specific single frequency excitation is considered to be a linear combination of several mode shapes contribution. The modal superposition theorem is defined by the following equation:

$$Y(\omega) = \left( \sum_{i=1}^{n} \frac{\phi_i^T \phi_i}{\omega_i \left[1 - \left(\frac{\omega}{\omega_i}\right)^2 + 2j\xi_i \frac{\omega}{\omega_i}\right]} \right) F(\omega) \quad (2)$$

wherein Y is structure displacement, F is the applied force on the structure, $\phi_i$ and $\omega_i$ are respectively the $i^{th}$ mode shape and the $i^{th}$ natural frequency and finally $\omega$ is the driving frequency of the applied force. The experimental modal analysis, or Operating Deflection Shape (ODS) is based on the measurement of the relations between the excitation and the response of the structure. Therefore, modal analysis techniques provides information about the physical characteristics of the structure to be tested through vibration, including the Frequency Response Function corresponding to a testing environment temperature, as the ratio of the response and the excitation, and defined in term of power spectral density amplitude over a global excitation frequency range for the vibratory excitation spectrum. As will be explained later in more detail with reference to FIG. 5, the FRF is characterized by a plurality of power spectral density amplitude peaks corresponding to a plurality of natural resonance frequencies, each being associated with respective mode shape and damping factor. The response measurement is performed using acceleration sensors and the excitation is made using a random acoustical source. The measurement of the excitation is conveniently performed with a microphone located under the PCB. Modal analysis is used to locate maximal stress region at each natural frequency in order to easily precipitate latent defects at a specific location of the PCB. Referring now to 2, there is illustrated a particular case where the excitation of the second mode shape at 421.5 Hz of a PCB, wherein the PCB model is represented by a line layout generally designated at 14 which corresponds to the second mode shape as obtained through the use of an experimental modal analysis software readily available in the marketplace, the "C" shaped heavier line at 16 representing a PTH connector on the PCB. This second mode excitation allows to precipitate soldier joints of the PTH connector 16 which is located with respect to reference axis system 13 at a maximum curvature point of the PCB as shown by the line layout. Therefore, it has been observed that the curvature of this second mode shape is well adapted to defect precipitation on connector solder joints.

Figure 2:
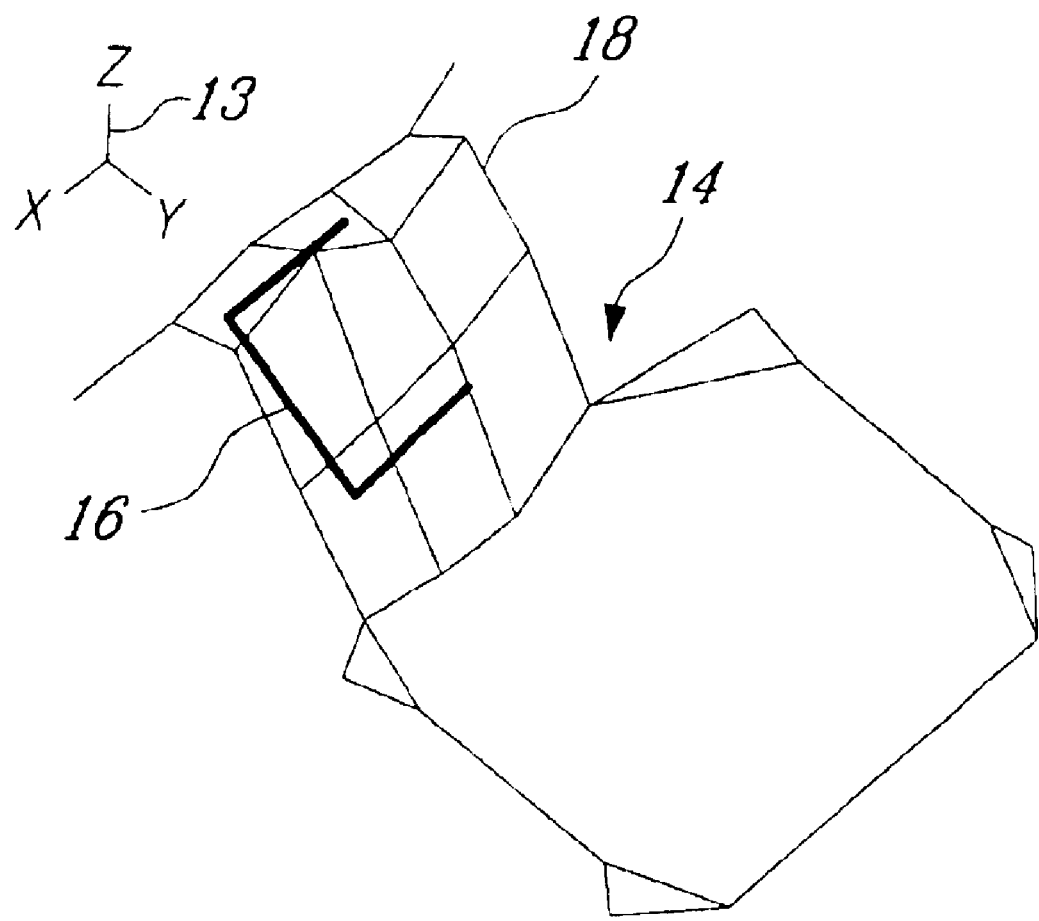
FIG. 2 is a schematic representation of modal analysis result as obtained for a typical PCB.
Figure 3:
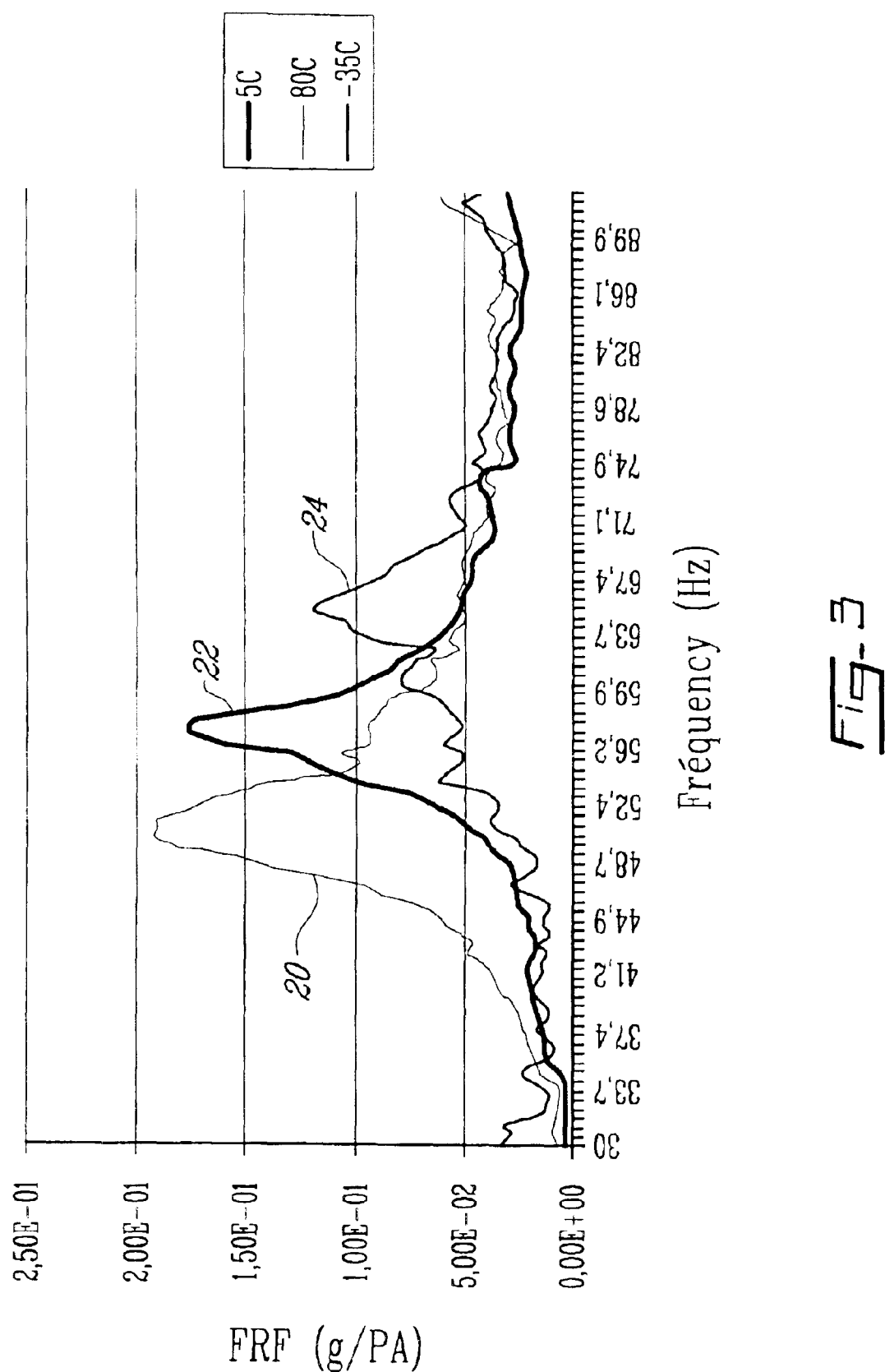
FIG. 3 is a graph showing the first resonance frequency variation with temperature for a typical PCB.

In order to perform combined acoustical and thermal experiments, testing set up and procedure are preferably provided to find temperature tailored spectrums for a typical bare PCB, the objective being not at this point of experiment to precipitate latent defects, but rather to identify tailored spectrums at different temperatures. The proposed experimental test plan may be composed of two simple steps, using a known testing system including an acoustical shaker combined with a thermal chamber as described by Lafleur et al. in U.S. patent application Ser. No. 10/018,348 dated Dec. 19, 2001. FRF measurements are conveniently performed by means of an accelerometer disposed on the PCB and a microphone positioned in the near field of the PCB. In the first step, a modal test is performed on the PCB at ambient temperature (typically of about 25° C.) to identify rapidly the resonance frequencies, damping and mode shapes. This requires a spatially distributed FRF measurement over the PCB at ambient temperature. It typically requests a 10 minute measurement duration. The results obtained are typically similar to those presented above with respect to FIG. 2. In the second step, the variation of the modal parameters over the range of a standard ESS process (−35° C. to +80° C.) is measured. The second step is the identification of the temperature variation of the resonance frequencies. It typically requests a 1 minute measurement duration per temperature. Turning now to FIG. 3, first resonance frequency variation with temperature for a typical 483 mm by 254 mm, 8 layers bare PCB is shown, wherein curves 20, 22 and 24 correspond to testing environment temperatures of 80° C., 5° C. and −35° C., respectively. It can be seen that the resonance shifts from 49 Hz at 80° C. to 65 Hz at −35° C. It has been experimentally shown that similar frequency shifts occur for higher vibration modes of the PCB. This illustrates the stiffness increase of the PCB at low temperature, explained by the variation of Young's modulus (E) of the material over temperature. By assuming a single degree of freedom behavior of the PCB at the first mode, stiffness variation has been evaluated with temperature, as graphically illustrated on FIG. 4. These results are consistent with those presented in well known handbooks that show that Young's modulus of most material decrease with temperature increase, such by R. A. Flinn et al. in *"Engineering Materials and their Applications"* Boston, 1975, pp.551, and in *"Engineering Materials Handbook"*, vol. 2. Metals Park, Ohio: ASM International, 1988.

Figure 4:
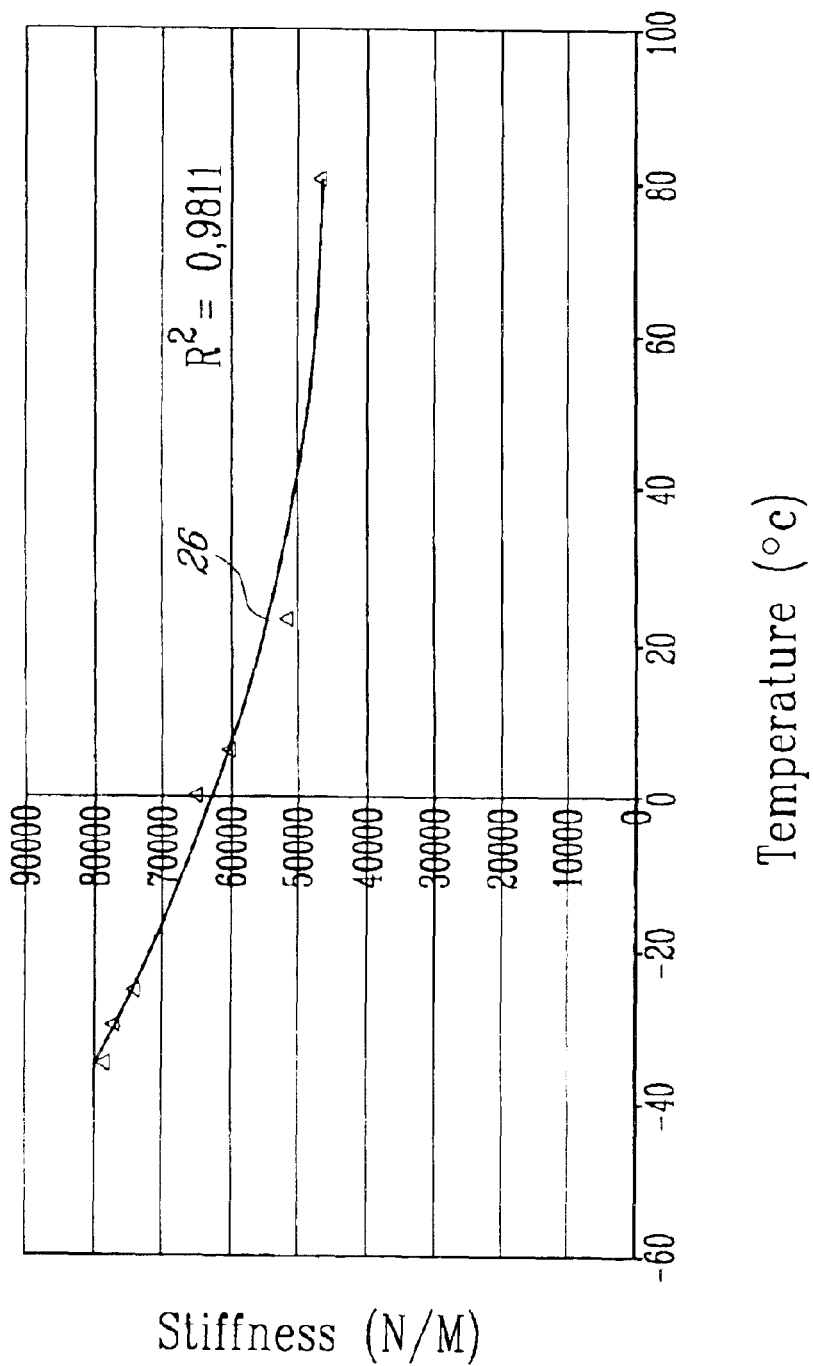
FIG. 4 is a graph showing stiffness variation with temperature for a typical PCB.

FIG. 4 shows a polynomial fit curve to the data at 26 according to the following relation:

$$y=2,4998x^2-402,35x+62769$$

with:

$$R^2=0,9811 \quad (3)$$

Such relation indicates a large variation of the PCB stiffness at low temperature and a less sensitive effect at high temperature. The consequence of this polynomial behavior for the spectrum tailoring method according to the invention is that one can expect greater variation on the low temperature tailored spectrum in comparison with ambient and high temperature spectra.

Figure 1B:
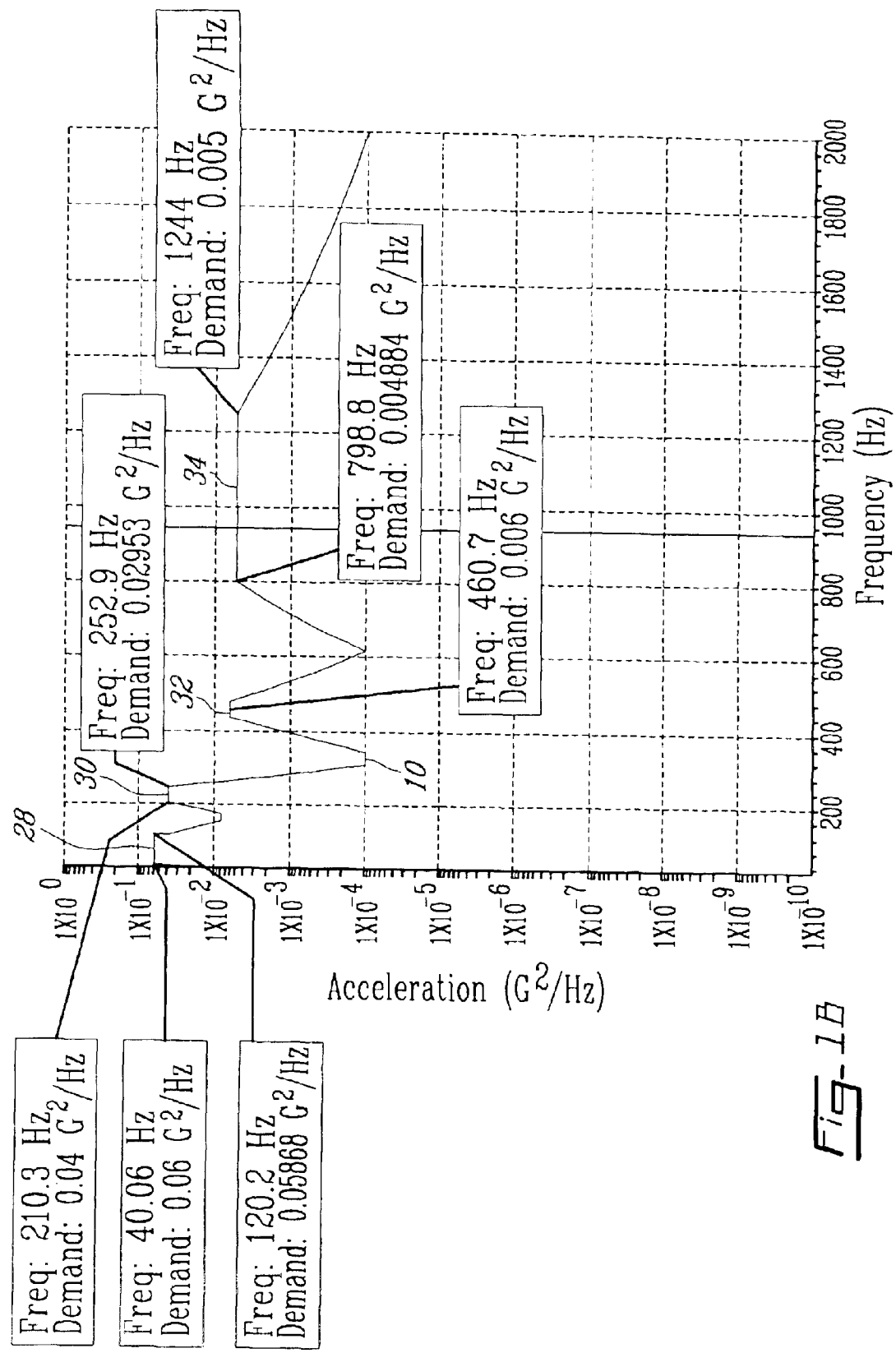
FIG. 1B is another graphical representation of the same spectrum shown in FIG. 1A, without showing the corresponding PCB's response.

Once the results of modal analysis are known, i.e natural resonance frequencies and associated mode shapes and damping factors characterizing the structure under test, the spectrum tailoring method may be performed, as will now be explained in detail with respect to a exemplary case involving a tested at room temperature. First, this section will present the tailoring procedure at room temperature using the same 483×254 mm, 8 layers telecom PCB provided with all electronic components mounted thereon and referred to above with respect to FIG. 1A. Then, the procedure will be used to construct some preliminary tailored spectrums for the bare PCB over an extended temperature range. On the fully populated PCB, the screening process prior to spectrum tailoring consisted of an heritage screen based on a fault replication process. This vibration profile was looking like the standard NAVMAT profile with a 8 g rms overall vibration level with a 10 minutes screen duration. This heritage screen was proved to precipitate rapidly bad solder joints on discrete components and on IC leads. The idea behind the construction of a tailored spectrum is to concentrate the energy around the resonance of the PCB and to lower the input level at the anti-resonances. Once this was done, the tailored vibration profile was looking like curve 10 shown in FIG. 1A, and as better shown in FIG. 1B, with an overall vibration level applied on the PCB of 3.5 g rms as mentioned above. Furthermore, the tailored profile was found to precipitate the same defects in equivalent time. This tailored spectrum was proved to be safe in not damaging good hardware by running a typical proof of screen. The profile was run 20 times on three different boards without any functional failure being observed during the vibration or any defect found at the post vibration inspection. This established that the maximum life reduction of this profile was less than 3.8% using a known zero defect statistical model, as the one proposed by M. Thomas in *"Fiabilité, maintenance et vibration de machine"*, Montreal, Quebec, Canada: Édition ETS, 2002, pp.600. The first steps for establishing the tailored spectrum consists of locating as part of the global excitation frequency range at least one anti-resonance frequency range extending between two natural resonance frequencies considered as main natural resonance frequencies, followed by defining, on the basis of the amplitude peaks corresponding to the main natural resonance frequencies and associated with each Frequency Response Function, at least two corresponding sets of blocks of amplitude peaks each including the amplitude peak associated with any other natural resonance frequency near corresponding main natural resonance frequency included in the corresponding set. In other words, the natural frequencies are grouped in blocks including at least one main frequency in a narrow range from typically 50 to 300 Hz bandwidth, the boundaries of each block being established according to the measured damping of the natural frequencies, coupled modes and location of the wide and deep anti-resonances on the FRF. For instance, if a natural frequency has large damping, it extends the block range accordingly. On the other hand, a block should be delimited when a large and wide anti-resonance appears. In the following, the procedure will be explained by applying it to a specific history case, but it can be easily generalized according to the FRF profile of each tested product. In the considered case illustrated by curve 10 of FIG. 1B, five (5) sets of natural frequencies were defined, namely a first set (41 Hz, 68 Hz, 79 Hz, 112 Hz) at low frequency range, second (213 Hz, 251 Hz), third (425 Hz, 460 Hz) and fourth (905 Hz, 975 Hz, 1006 Hz, 1250 Hz) sets at medium frequency range and fifth set (1843 Hz) at high frequency range. The following step of the spectrum tailoring method consists of defining from the (at least two) sets of amplitude peaks associated with each FRF at least two spectral profile sections associated with corresponding frequency ranges as part of the global excitation frequency range, each spectral profile section being expressed as Power Spectral Density (PSD) amplitude according to the mode shape and damping factor associated with the corresponding main and any other natural resonance frequencies and to the location of the critical elements provided on the structure to be subjected to vibration testing. This procedure results in a vibratory excitation spectrum capable of maximizing vibration power transfer to the critical elements of the structure, such as the connectors, resistors, capacitors, inductances, Integrated Circuits (IC) or Ball Grid Array components (BGA) of a PCB, at the current testing environment temperature. In practice, this can be done from the mode shapes of the PCB. The amplitude at each frequency set or block can be modulated according to the maximum curvature location of the excited modes and to the location of the critical PCB components. In the considered example as illustrated in FIG. 1B, since the first set of frequencies generally designated at 28 exhibits a wide spatial distribution of the stress on the board, a higher PSD level is applied in this frequency range. The PSD level for the first and second sets designated at 28, 30 were set respectively at 0.06 g²/Hz and 0.04 g²/Hz. Lower PSD level were considered for the third and fourth sets designated at 32, 34 to emphasize on the lower PCB mode shapes. The fifth block at the frequency of 1843 Hz was not considered. This explains why the response of the PCB differs from the demand at this frequency as shown on FIG. 1A. A further validation step of the resulting tailored spectrum may be performed through a proof of screen as discussed above.

Figure 5:
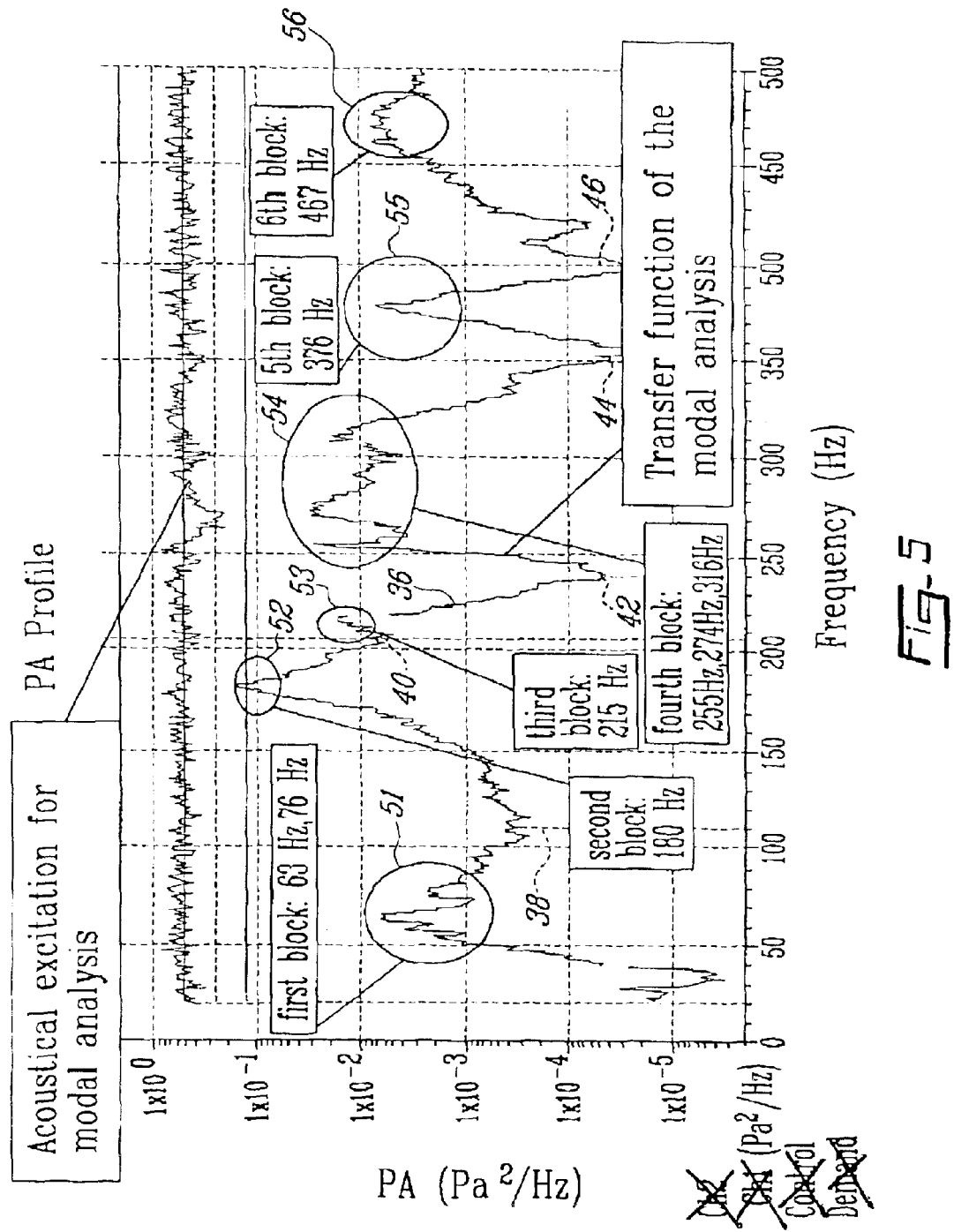
FIG. 5 is a graph representing the Frequency Response Function (FRF) obtained through a modal analysis process preformed on a typical bare PCB, showing several profile sections as defined using the basic embodiment of the method according to the invention at high temperature (+60° C.)

When combining thermal and vibration stresses to the PCB, the natural frequency shift at various temperatures must be considered and the tailored profiles must be adapted accordingly. The knowledge of the natural frequencies versus temperature allows to construct a combined tailored excitation for the PCB. Two definition methods can be used. The first method consists in defining a specific tailored spectrum for each specific temperature using the shifted natural frequencies of the PCB, as shown in FIG. 3 discussed above. This first type of spectrum is well adapted to constant temperature environment such as stabilization periods at room temperature (typically of about +25° C.), low temperature (typically of about −40° C.) or at high temperature (typically of about +60° C.). Turning to FIG. 5, the FRF curve at 36 measured through modal analysis at a high temperature of +60° C. is shown. The principle of the tailoring method according to the invention is based on the location of the anti-resonances as indicated at 38 (110 Hz), 40 (205 Hz), 42 (240 Hz), 44 (360 Hz) and 46 (400 Hz) on the FRF shown, and the regrouping of amplitude peaks corresponding to the natural frequencies into sets or blocks of amplitude peaks indicated at 51, 52, 53, 54, 55 and 56 within the global excitation frequency range shown (20–500 Hz), to define six (6) spectral profile sections associated with corresponding frequency ranges as part of the global excitation frequency range. The amplitude of the PSD level of excitation at each spectral profile section can be modulated according to the maximum curvature location of the excited mode shapes and to the location of the critical PCB components, to form a vibratory excitation spectrum capable of maximizing vibration power transfer to the critical elements of the PCB to be subjected to vibration at each testing environment temperature.

Figure 6:
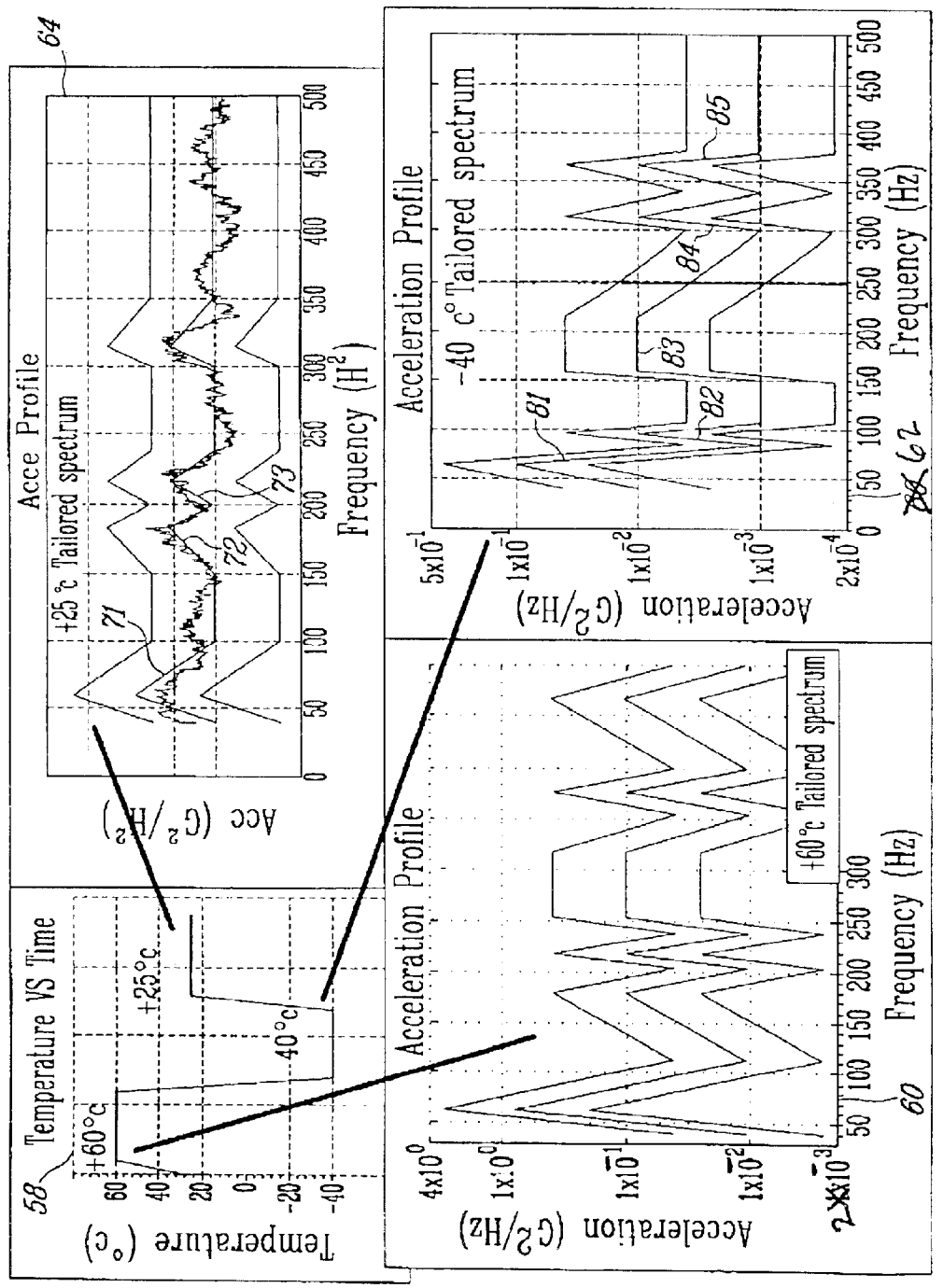
FIG. 6 shows a graph representing the values of three (3) typical testing environment temperatures with time and their respective graphs representing the spectrums tailored to the physical characteristics of the bare PCB as obtained from the FRF shown in FIG. 5 and related data, using the basic preferred embodiment of a method according to the invention.
Figure 7:
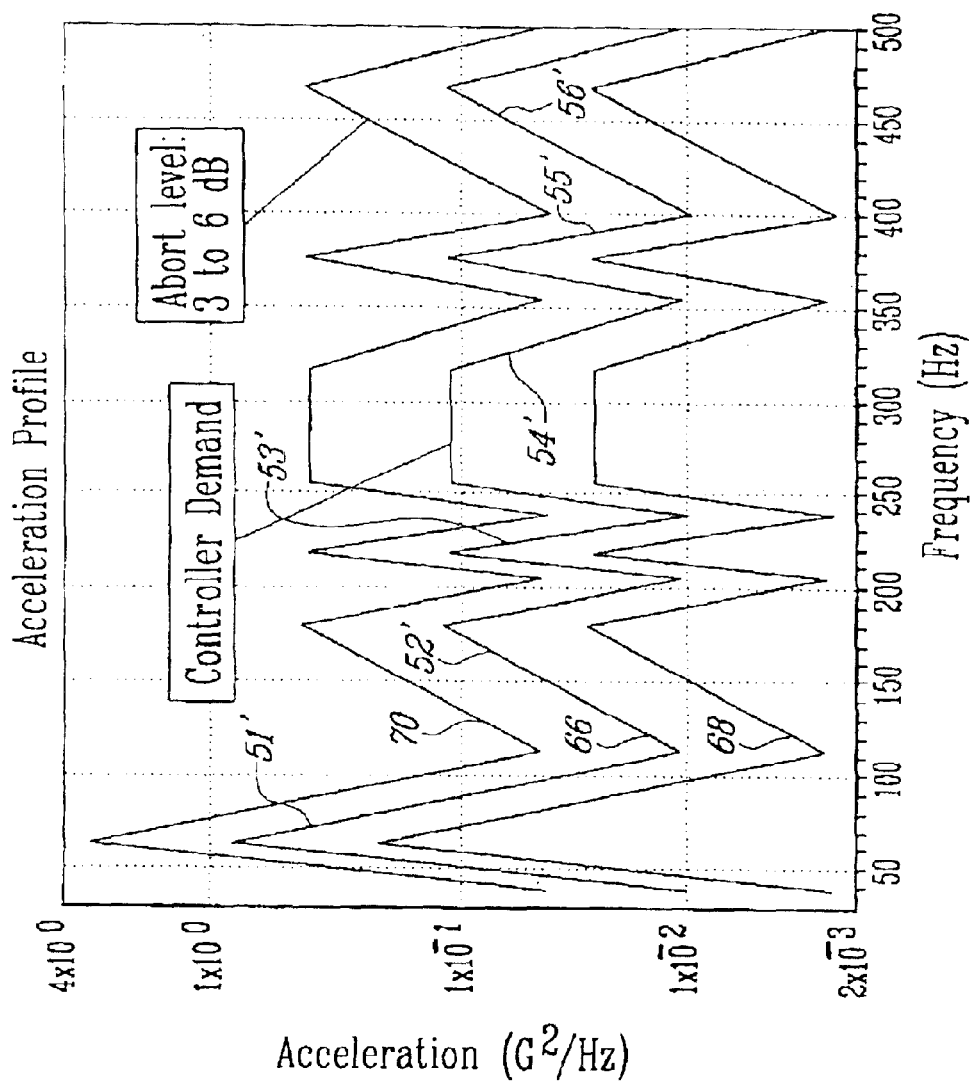
FIG. 7 is an enlarged view of the graph corresponding to a high temperature (+60° C.) testing as shown in FIG. 6.

Referring now to FIG. 6, the definition of tailored spectrums for a combined temperature and vibration ESS process will now be explained. FIG. 6 shows a first graph at 58 representing the values of three (3) typical testing environment temperatures with time, namely +60° C., −40° C. and ambient +25° C., along with a series of three (3) graphs 60, 62, 64 representing the spectrums tailored to the physical characteristics of the bare PCB as obtained from the FRF shown in FIG. 5 and related modal analysis related data as described before, for each said testing environment temperature, using the first tailoring approach. Turning now to FIG. 7 which shows an enlarged view of the graph corresponding to a high temperature (+60° C.) testing as shown in FIG. 6, defined tailored spectrums extracted from the modal information that must be applied at the temperature +60° C. for the PCB are represented by curves 66, 68 and 70, respectively corresponding to the programmed demand generated by the vibration controller to reflect the FRF profile, to a lower warning limit spectrum set at 3 dB level, and to an upper abort limit spectrum set at 6 dB level. As explained above, the amplitude of the first set of frequency block is increased in order to excite the first modes. More input energy is allowed close to the natural frequencies included in each of the spectrum profile sections, namely first at 51'(49 Hz, 55 Hz, 58 Hz, 63 Hz, 76 Hz ), second at 52'(180 Hz ), third at 53' (215 Hz ), fourth at 54'(255 Hz, 274 Hz, 316 Hz), fifth at 55' (376 Hz) and sixth at 56' (467 Hz), while the input is reduced at the five anti-resonances as previously defined. Turning back to FIG. 6, the tailored spectrum at ambient (+25° C.) and at low temperature (−40° C.) were constructed in the same way. At ambient temperature, four spectral profile sections were defined: first at 71 (55 Hz, 65 Hz), second ate 72 (183 Hz) third at 73 (217 Hz) and fourth at 74 (317 Hz). A constant excitation after 400 Hz was found sufficient. At a testing environment temperature of −40° C., five (5) spectral profile sections were defined: first at 81 (65 Hz), second at 82 (96 Hz), third at 83 (166 Hz, 178 Hz, 198 Hz, 213 Hz), fourth at 84 (313 Hz) and fifth at 85 (368 Hz).

According to a further broad aspect of the present invention, the obtained spectrums can be used as part of a method for vibratory testing the structure having critical elements located thereon at a plurality of sequential testing environment temperatures, using any suitable known vibration testing system such as the acoustical vibrator referred to above. The method requires determining a set of vibratory excitation spectrums tailored to physical characteristics of the structure from a plurality of frequency response functions representing the physical characteristics at the testing environment temperatures, each said function being defined in term of power spectral density amplitude over the global excitation frequency range for all vibratory excitation spectrums, and imparting vibration to the structure according to each vibratory excitation spectrum sequentially at each corresponding testing environment temperature to maximize vibration power transfer to the critical elements of the structure.

Figure 8:
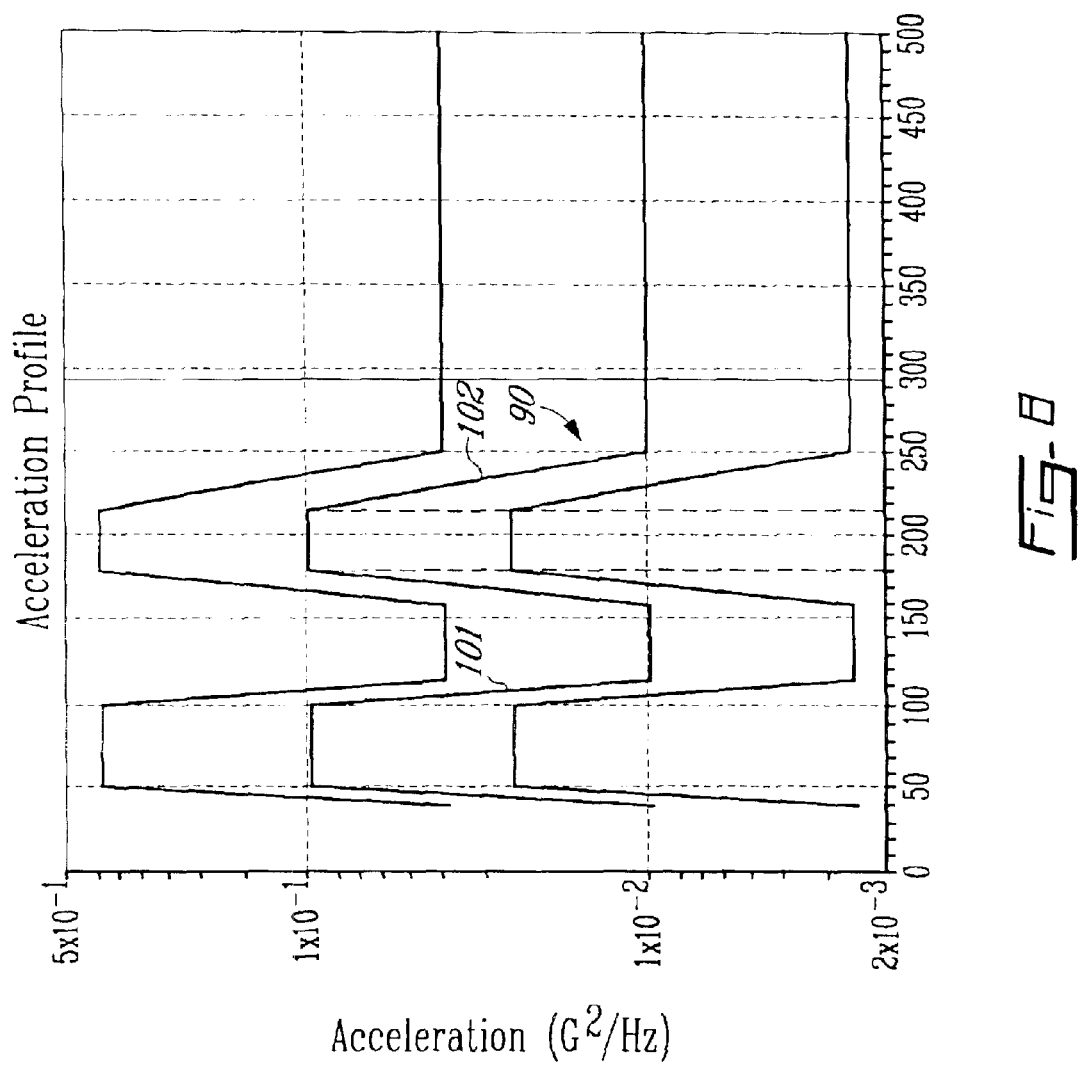
FIG. 8 is a graph representing a spectrum tailored to the physical characteristics of the same bare PCB, as obtained from the FRF shown in FIG. 5 and related data, using a second preferred embodiment of a method according to the invention.

The second spectrum tailoring approach according to the invention consists in defining a unique tailored spectrum that takes into account the natural frequency shift span domain over the temperature range of the ESS process. This second type of spectrum is well adapted to thermal ramping environment such as transition from high to low temperature. FIG. 8 shows a typical common spectrum control curve 90 that allows to consider the most relevant frequencies. This profile was constructed at a lower vibration level using the frequency span of the first four spectral profile sections defined in the above described example for the three testing environment temperatures, by selecting the following limit frequencies: 49 Hz (first section at +60° C.) and 96 Hz (second section at −40° C.) for the first profile section at 101, 166 Hz (third section at −40° C.) and 217 Hz (third profile section at 25° C.) for the second profile section at 102.

According to a further broad aspect of the present invention, the obtained spectrum can be used as part of a method for vibratory testing the structure having critical elements located thereon at a plurality of sequential testing environment temperatures, using the same known vibration testing system as referred to above. The method requires determining a vibratory excitation spectrum tailored to physical characteristics of the structure from a plurality of frequency response functions representing the physical characteristics at all testing environment temperatures, each function being defined in term of power spectral density amplitude over a global excitation frequency range for the vibratory excitation spectrum, and sequentially imparting vibration to the structure according to the vibratory excitation spectrum at the sequential testing environment temperatures to maximize vibration power transfer to the critical elements of the structure. Typically, the latter step typically includes imparting vibration to the structure according to the vibratory excitation spectrum at a first testing environment temperature, imparting vibration to the structure according to the same vibratory excitation spectrum while varying the temperature from the first temperature to a second testing environment temperature, and imparting vibration to the structure according to the vibratory excitation spectrum at the second testing environment temperature.

What is claimed is:

1. A method for determining a vibratory excitation spectrum tailored to physical characteristics of a structure having critical elements located thereon to be subjected to vibration testing, said physical characteristics including a frequency response function corresponding to a testing environment temperature and defined in term of power spectral density amplitude over a global excitation frequency range for said vibratory excitation spectrum and characterized by a plurality of power spectral density amplitude peaks corresponding to a plurality of natural resonance frequencies each being associated with respective mode shape and damping factor, the method comprising the steps of:

i) locating as part of said global excitation frequency range at least one anti-resonance frequency range extending between two said natural resonance frequencies considered as main natural resonance frequencies;

ii) defining on a basis of the amplitude peaks corresponding to said main natural resonance frequencies at least two corresponding sets of amplitude peaks each including the amplitude peak associated with any other said natural resonance frequency near corresponding said main natural resonance frequency included in said corresponding set; and iii) defining from said at least two sets of amplitude peaks at least two spectral profile sections associated with corresponding frequency ranges as part of said global excitation frequency range, each said spectral profile section being expressed as power spectral density amplitude according to the mode shape and damping factor associated with corresponding said main and any other natural resonance frequencies and to the location of said critical elements, to form a vibratory excitation spectrum capable of maximizing vibration power transfer to the critical elements of the structure to be subjected to vibration at said testing environment temperature.

2. The method according to claim 1, wherein said physical characteristics further include a frequency response function corresponding to a further testing environment temperature and defined in term of power spectral density amplitude over said global excitation frequency range and characterized by a plurality of further power spectral density amplitude peaks corresponding to a plurality of further natural resonance frequencies ach being associated with respective further mode shape and damping factor, said method further comprising the steps of:

iv) repeating said steps i) to ii) on a basis of said further natural resonance frequencies; and v) repeating said step iii) on a basis of said further mode shape and damping factor to form a vibratory excitation spectrum capable of maximizing vibration power transfer to the critical elements of the structure to be subjected to vibration at said further testing environment temperature.

3. A method for determining a set of vibratory excitation spectrums tailored to physical characteristics of a structure having critical elements located thereon to be subjected to vibration testing under a plurality of testing environment temperatures, the method comprising the step of:

i) providing a plurality of frequency response functions representing said physical characteristics at said testing environment temperatures, each said function being defined in term of power spectral density amplitude over a global excitation frequency range for all said vibratory excitation spectrums and characterized by a plurality of power spectral density amplitude peaks corresponding to a plurality of natural resonance frequencies each being associated with respective mode shape and damping factor;

ii) locating as part of said global excitation frequency range and for each said frequency response function at least one anti-resonance frequency range extending between two said natural resonance frequencies considered as main natural resonance frequencies;

iii) defining on a basis of the amplitude peaks corresponding to said main natural resonance frequencies and associated with each said frequency response function at least two corresponding sets of amplitude peaks each including the amplitude peak associated with any other said natural resonance frequency near corresponding said main natural resonance frequency included in said corresponding set; and iv) defining from said at least two sets of amplitude peaks associated with each said frequency response function at least two spectral profile sections associated with corresponding frequency ranges as part of said global excitation frequency range, each said spectral profile section being expressed as power spectral density amplitude according to the mode shape and damping factor associated with corresponding said main and any other natural resonance frequencies and to the location of said critical elements, to form each said vibratory excitation spectrum capable of maximizing vibration power transfer to the critical elements of the structure to be subjected to vibration at each said testing environment temperature.

4. A method for determining a vibratory excitation spectrum tailored to physical characteristics of a structure having critical elements located thereon to be sequentially subjected to vibration testing under a plurality of testing environment temperatures, the method comprising the step of:

i) providing a plurality of frequency response functions representing said physical characteristics at said testing environment temperatures, each said function being defined in term of power spectral density amplitude over a global excitation frequency range for said vibratory excitation spectrum and characterized by a plurality of power spectral density amplitude peaks corresponding to a plurality of natural resonance frequencies each being associated with respective mode shape and damping factor;

ii) locating as part of said global excitation frequency range and for each said frequency response function at least one anti-resonance frequency range extending between two said natural resonance frequencies considered as main natural resonance frequencies;

iii) defining on a basis of the amplitude peaks corresponding to said main natural resonance frequencies and associated with each said frequency response function at least two corresponding sets of amplitude peaks each including the amplitude peak associated with any other said natural resonance frequency near corresponding said main natural resonance frequency included in said corresponding set; and iv) defining from said at least two sets of amplitude peaks at least one spectral profile section associated with a corresponding frequency range as part of said global excitation frequency range, each said spectral profile section being expressed as power spectral density amplitude according to the mode shape and damping factor associated with corresponding said main and any other natural resonance frequencies and to the location of said critical elements, to form a vibratory excitation spectrum capable of maximizing vibration power transfer to the critical elements of the structure to be subjected to vibration at all said testing environment temperatures.

5. A method for vibratory testing a structure having critical elements located thereon at a plurality of sequential testing environment temperatures, comprising th steps of:

i) determining a set of vibratory excitation spectrums tailored to physical characteristics of the structure from a plurality of frequency response functions representing said physical characteristics at said testing environment temperatures, each said function being defined in term of power spectral density amplitude over a global excitation frequency range for all said vibratory excitation spectrums; and ii) imparting vibration to said structure according to each said vibratory excitation spectrum sequentially at each corresponding said testing environment temperature to maximize vibration power transfer to the critical elements of the structure.

6. The method according to claim 5, wherein said step i) includes the steps of:
   a) providing a plurality of frequency response functions representing said physical characteristics at said testing environment temperatures, each said function being defined in term of power spectral density amplitude over a global excitation frequency range for all said vibratory excitation spectrums and characterized by a plurality of power spectral density amplitude peaks corresponding to a plurality of natural resonance frequencies each being associated with respective mode shape and damping factor;
   b) locating as part of said global excitation frequency range and for each said frequency response function at least one anti-resonance frequency range extending between two said natural resonance frequencies considered as main natural resonance frequencies;
   c) defining on a basis of the amplitude peaks corresponding to said main natural resonance frequencies and associated with each said frequency response function at least two corresponding sets of amplitude peaks each including the amplitude peak associated with any other said natural resonance frequency near corresponding said main natural resonance frequency included in said corresponding set;
   d) defining from said at least two sets of amplitude peaks associated with each said frequency response function at least two spectral profile sections associated with corresponding frequency ranges as part of said global excitation frequency range, each said spectral profile section being expressed as power spectral density amplitude according to the mode shape and damping factor associated with corresponding said main and any other natural resonance frequencies and to the location of said critical elements, to form each said vibratory excitation spectrum capable of maximizing vibration power transfer to the critical elements of the structure to be subjected to vibration at each said testing environment temperature.

7. A method for vibratory testing a structure having critical elements located thereon at a plurality of sequential testing environment temperatures, comprising the steps of:
   i) determining a vibratory excitation spectrum tailored to physical characteristics of the structure from a plurality of frequency response functions representing said physical characteristics at all said testing environment temperatures, each said function being defined in term of power spectral density amplitude over a global excitation frequency range for said vibratory excitation spectrum; and
   ii) sequentially imparting vibration to said structure according to said vibratory excitation spectrum at said sequential testing environment temperatures to maximize vibration power transfer to the critical elements of the structure.

8. The method according to claim 7, wherein said step ii) includes the steps of:
   a) imparting vibration to said structure according to said vibratory excitation spectrum at a first one of said testing environment temperatures;
   b) imparting vibration to said structure according to said vibratory excitation spectrum while varying the temperature from said first temperature to a second one of said testing environment temperatures; and
   c) imparting vibration to said structure according to said vibratory excitation spectrum at said second testing environment temperature.

9. The method according to claim 7, wherein said step i) includes the steps of:
   a) providing a plurality of frequency response functions representing said physical characteristics at said testing environment temperatures, each said function being defined in term of power spectral density amplitude over a global excitation frequency range for said vibratory excitation spectrum and characterized by a plurality of power spectral density amplitude peaks corresponding to a plurality or natural resonance frequencies each being associated with respective mode shape and damping factor;
   b) locating as part of said global xcitation frequency range and for each said frequency response function at least one anti-resonance frequency range extending between two said natural resonance frequencies considered as main natural resonance frequencies;
   c) defining on a basis of the amplitude peaks corresponding to said main natural resonance frequencies and associated with each said frequency response function at least two corresponding sets of amplitude peaks each including the amplitude peak associated with any other said natural resonance frequency near corresponding said main natural resonance frequency included in said corresponding set;
   d) defining from said at least two sets of amplitude peaks at least one spectral profile section associated with a corresponding frequency range as part of said global excitation frequency range, each said spectral profile section being expressed as power spectral density amplitude according to the mode shape and damping factor associated with corresponding said main and any other natural resonance frequencies and to the location of said critical elements, to form said vibratory excitation spectrum capable of maximizing vibration power transfer to the critical elements of the structure to be subjected to vibration at all said testing environment temperatures.

10. The method according to claim 9, wherein said step ii) includes the steps of:
   a) imparting vibration to said structure according to said vibratory excitation spectrum at a first one of said testing environment temperatures;
   b) imparting vibration to said structure according to said vibratory excitation spectrum while varying the temperature from said first temperature to a second one of said testing environment temperatures; and
   c) imparting vibration to said structure according to said vibratory excitation spectrum at said second testing environment temperature.

* * * * *

UNITED STATES PATENT AND TRADEMARK OFFICE
CERTIFICATE OF CORRECTION

PATENT NO. : 6,810,741 B1
DATED : November 2, 2004
INVENTOR(S) : François Lafleur et al.

It is certified that error appears in the above-identified patent and that said Letters Patent is hereby corrected as shown below:

Column 2,
Line 9, -- in -- should be inserted after "disclosed"
Line 34, "and" should be cancelled
Line 59, "HZ" should read -- Hz --

Column 7,
Line 45, "calculat" should read -- calculate --
Line 64, "provides" should read -- provide --

Column 8,
Line 15, -- Fig. -- should be inserted after "to"

Column 11,
Line 54, "ate" should read -- at --

Column 13,
Line 26, "ach" should read -- each --

Column 14,
Line 54, "th" should read -- the --

Column 16,
Line 21, "xcitation" should read -- excitation --

Signed and Sealed this

Twenty-fourth Day of May, 2005

JON W. DUDAS
*Director of the United States Patent and Trademark Office*